United States Patent [19]

Stewart, III

[11] Patent Number: 4,749,089

[45] Date of Patent: Jun. 7, 1988

[54] BICYCLE RACK

[76] Inventor: John W. Stewart, III, #3 Twin Cir., Houston, Tex. 77042

[21] Appl. No.: 595

[22] Filed: Jan. 6, 1987

[51] Int. Cl.⁴ ............................................. A47F 7/00
[52] U.S. Cl. ...................................... 211/18; 248/447
[58] Field of Search .................... 211/18, 17, 88, 87, 211/106; 248/497, 498, 447; 224/42.03 B

[56] References Cited

U.S. PATENT DOCUMENTS

| | | | |
|---|---|---|---|
| 614,503 | 11/1898 | Sackett | 211/17 X |
| 1,025,971 | 5/1912 | Fulde | 211/18 X |
| 2,642,190 | 6/1953 | Kelly | 211/88 |
| 2,996,192 | 8/1961 | Dell et al. | 211/70.6 X |
| 3,782,559 | 1/1974 | Wright | 211/17 |
| 3,986,649 | 10/1976 | Heimstra | 211/88 X |
| 4,060,216 | 11/1977 | Million | 248/447 X |

FOREIGN PATENT DOCUMENTS 548010  4/1932  Fed. Rep. of Germany ........ 211/88

OTHER PUBLICATIONS

*American Bicyclist* (magazine) p. 28, 3-19-87.

Primary Examiner—Ramon S. Britts
Assistant Examiner—Blair Johnson
Attorney, Agent, or Firm—Vaden, Eickenroht, Thompson & Boulware

[57] ABSTRACT

There is disclosed a rack for mounting a bicycle from a wall by means of a pair of horizontally spaced picture hooks, the rack comprising a relative flat base having rings pivotally mounted on the back side thereof each to fit within one of the hooks, a pair of legs having their upper ends carried by the base to dispose their lower ends in position in to engage the wall beneath the base, and a pair of arms each having one end pivotally connected to the base for swinging between an inner position in which its other end is beneath the lower end of the base and an outer position in which its other end extends therefrom in horizontally spaced relation with respect to the other arm, the legs being of such configuration as to be inwardly yieldable to permit the base to assume a more vertical position under the weight of the bicycle.

6 Claims, 2 Drawing Sheets

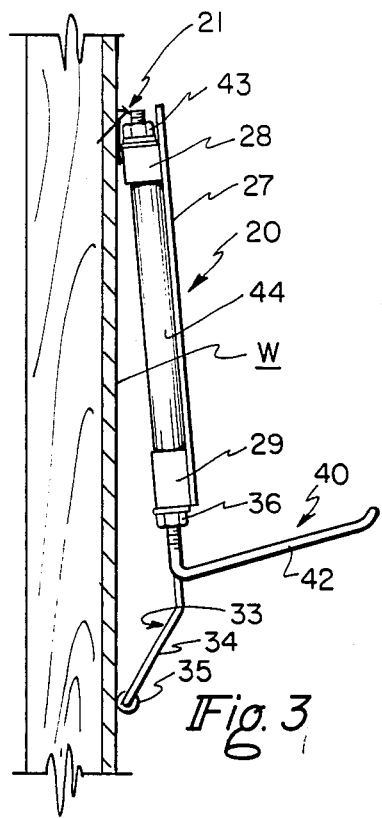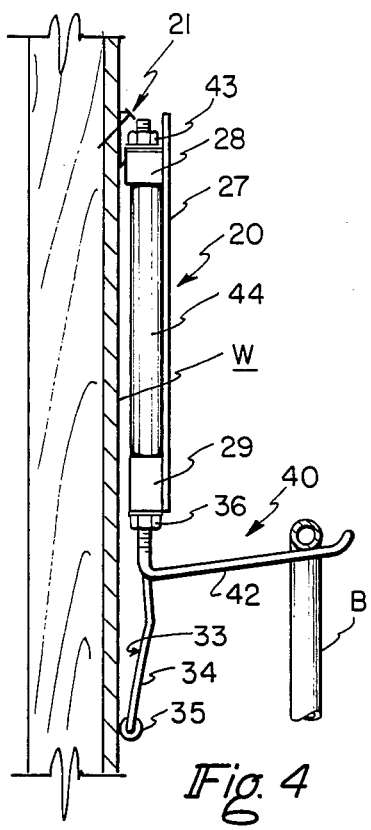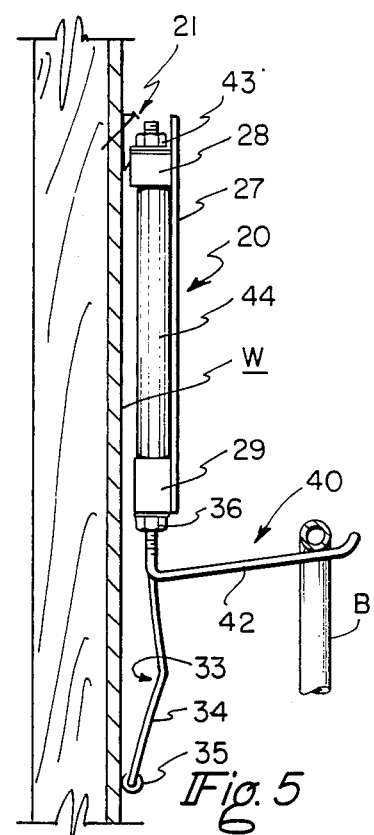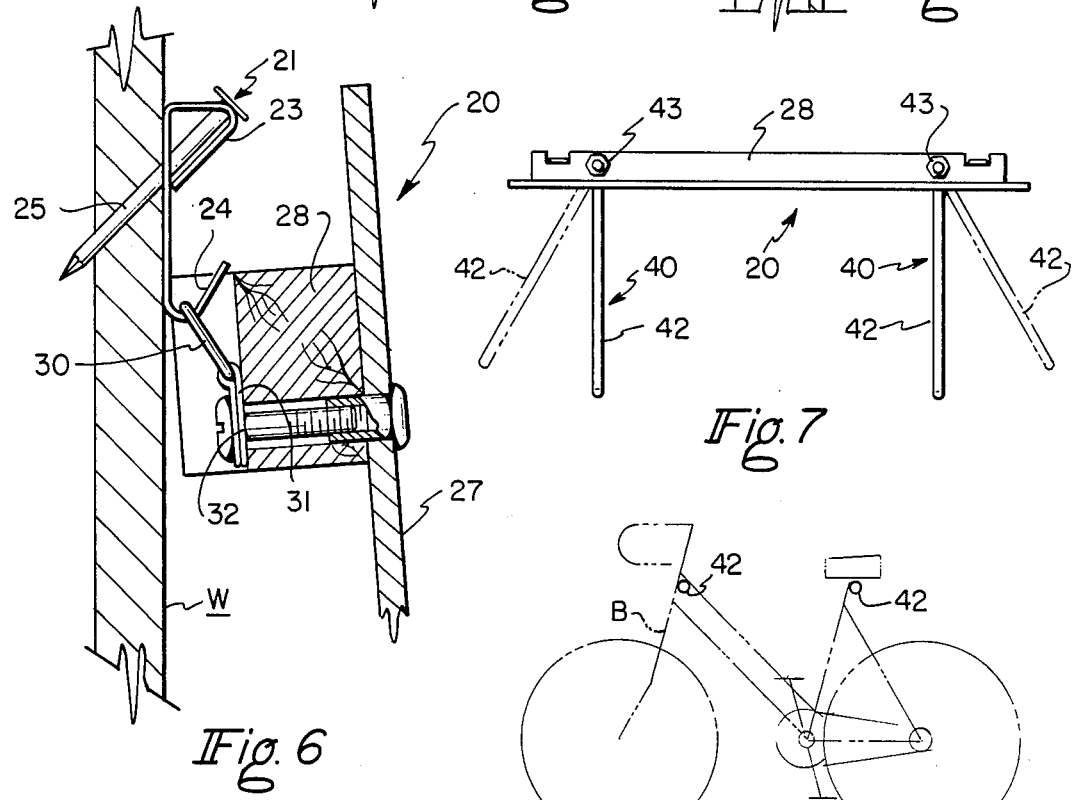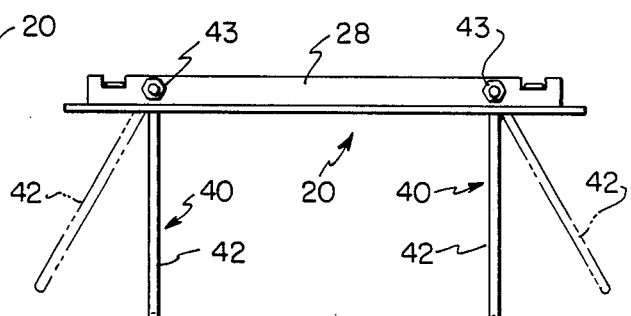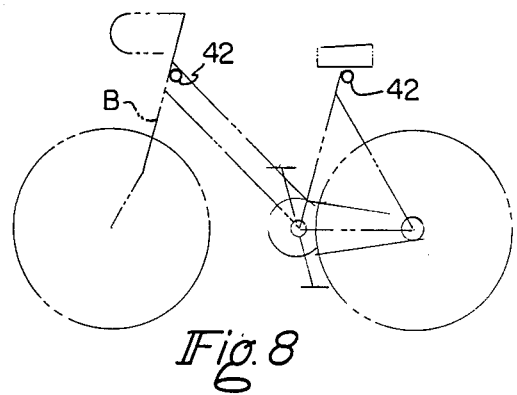

BICYCLE RACK

This invention relates generally to a bicycle rack, and, more particularly, to an improved rack for mounting a bicycle from a wall.

It is frequently desirable to mount a bicycle on an interior wall, and thus to conserve floor space and otherwise lessen congestion in cramped quarters. Also, of course, this removes the bicycle from locations in which harmful contact is most likely to occur.

Due to their weight and bulk, it has heretofore been thought necessary to mount bicycles on large brackets or hooks secured to the wall. This, however, leaves large holes in the wall, and, in some cases, particularly when the wall is sheetrock, causes permanent damage if the brackets or hooks are pulled from the wall.

The primary object of this invention is to provide a bicycle rack which may be mounted on a wall by ordinary picture hooks, and which is no more likely to pull the hooks from the wall than a picture of comparable weight.

Another object is to provide such a rack which is of light weight and inexpensive construction, and which, when not in use, occupies relatively little space.

These and other objects are accomplished, in accordance with the illustrated embodiment of the invention, by a bicycle rack comprising a relatively flat base having rings pivotally mounted on the back side thereof each to fit within one of a pair of horizontally spaced picture hooks on the wall so as to suspend the base therefrom, means carried by the base for engaging the wall beneath the hooks in order to hold the base in an outwardly inclined position with respect to the wall, and additional means carried by the base for extension from the front side thereof in order to support the bicycle frame therefrom. More particularly, the means for engaging the wall is inwardly yieldable so as to permit the base to assume a more vertical position under the weight of the bicycle, whereby the load due to the bicycle acts in a substantially vertical direction so as to minimize the risk of pulling the hooks from the wall.

As illustrated, the wall engaging means comprises legs whose upper ends are connected to the base and whose lower ends are bent inwardly with respect to their lower ends to engage the wall below the base, and which are inwardly flexible intermediate their upper and lower ends to cushion the load transmitted from the bicycle to the wall as the base assumes a more vertical position. Preferably, the upper ends of the legs are connected to the base for vertical adjustment with respect thereto in order to raise or lower their lower ends, and thus vary the degree to which the load of the bike is cushioned depending on its weight. As illustrated, the lower ends of the legs are connected by horizontally extending member which is slidable vertically along the wall as the legs flex.

The frame supporting means preferably comprises a pair of generally "V" shaped arms each having one end pivotally connected to the base for swinging thereabout between an inner position in which its other end is beneath the lower end of the base and an outer position in which its other end extends therefrom in horizontally spaced relation with respect to the other arm. More particularly, the ends of the arms are connected to the base for swinging about generally vertical axes so that their angular relation with respect to one another may be adjusted in order to fit the frame of a particular bicycle.

In the drawings, wherein like numbers are used throughout to indicate like parts:

FIG. 3 is a side view of the rack with the base and legs in the positions they occupy with respect to the wall prior to mounting a bicycle thereon;

FIG. 4 is a view similar to FIG. 3, but upon mounting of the bicycle from the rack to cause its base to assume a more vertical position;

FIG. 5 is a view similar to FIG. 3, but with the legs thereof moved to a lower position relative to the base to engage the wall at a lower level;

FIG. 6 is an enlarged vertical sectional view of an upper portion of the rack and illustrating the suspension of one of the rings on the back side thereof from one of the picture hooks;

FIG. 7 is a view from the top of the rack, and showing in broken lines an alternate position which the supporting arms may assume to fit a particular bicycle frame; and FIG. 8 is a front view of the rack with its arms in position to support the frante of a girl's bicycle.

Figure 1:
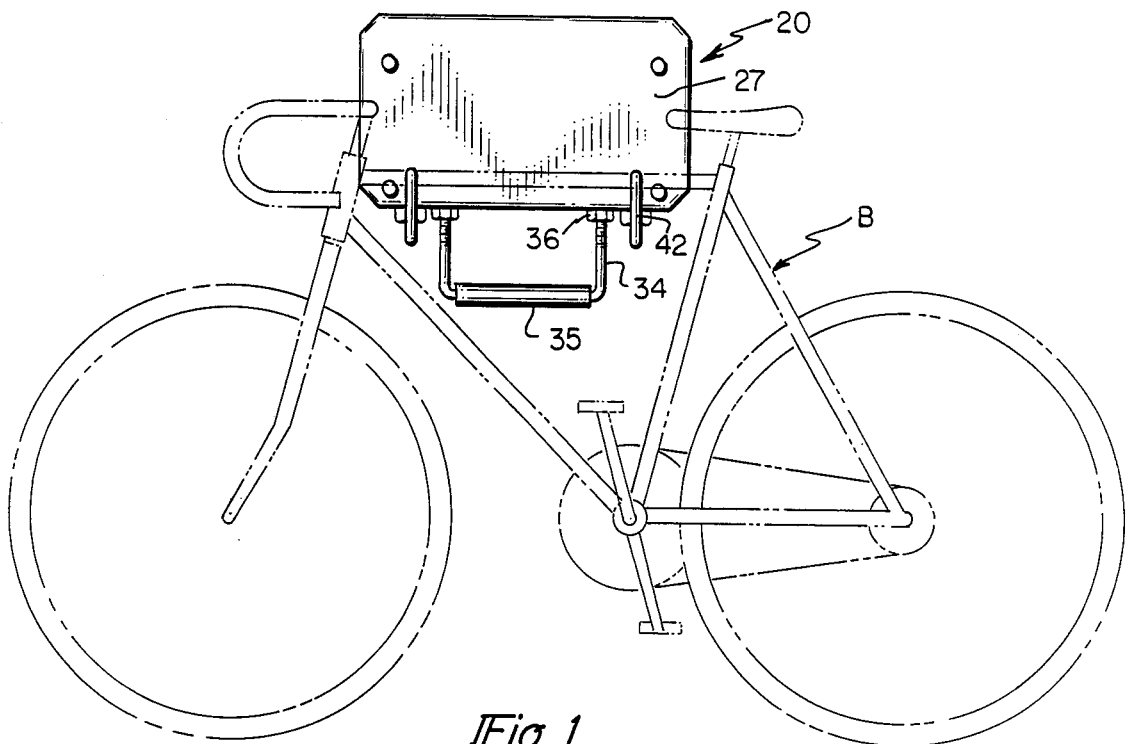
FIG. 1 is a front view of the rack with a bicycle supported therefrom.

With reference to the details of the above described drawings, a pair of picture hooks 21 have been driven into the wall W in horizontally spaced apart relation preparatory to suspending a rack 20 therefrom at a level to mount the bicycle B from the wall at a desired location. The picture hooks are of conventional construction comprising, as best shown in FIG. 6, a metal strip 22 having a loop 23 formed at the upper end of its front side and a hook 24 at the front side of its lower end having an upwardly and outwardly disposed outer retaining wall. The loop and strip 22 have holes therein which are aligned to closely receive a nail 25 at a downwardly and inwardly inclined angle with respect to the wall. Thus, as well known in the art, the strip 22 is held against the wall as the nail is driven through the holes and into the wall so as to secure the hook to the wall.

The rack 20 includes a relatively flat base 26 comprised of a rectangular sheet 27 of plastic or wood and a pair of horizontal bars 28 and 29 secured to the back side of the sheet 27 in vertically spaced relation, as by means of bolts.

Figure 2:
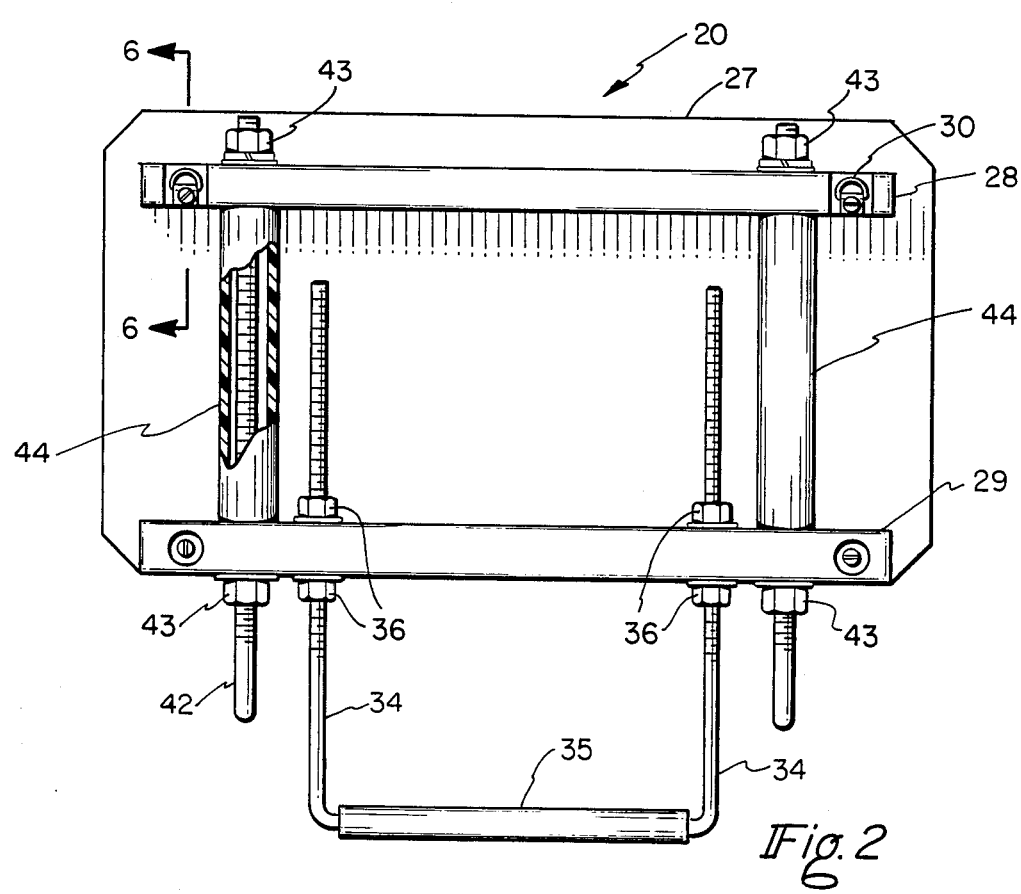
FIG. 2 is an enlarged rear view of the rack, with a portion thereof broken away.

As shown in FIG. 6, rings 30 of a type conventionally used in the hanging of portraits are secured to the upper bar 28 in a horizontally spaced relation corresponding generally to the spacing of the picture hooks 21. Again as shown in FIG. 6, the rings are pivotally connected to hinges 31 which are in turn secured to the sheet 27 of the base, as by means of the bolts 30 which secure the upper bar to the sheet. Preferably, each ring is mounted on the upper bar within a vertical recess 32 on the backside thereof so as to facilitate looping of the ring over the loop 24 of one of the picture hooks. As can be seen from FIG. 2, the weight of the rack, particularly when the bicycle is mounted thereon, pulls the rings into a generally vertically extending position, thereby maintaining a substantially vertical load on the picture hook 21.

However, prior to mounting the bicycle thereon, the base 26 is initially held in a slightly outwardly inclined position, by means of a "U" shaped member 33 having its legs 34 threaded connected at their upper ends to the lower bar 29 of the base to dispose the laterally extending member 35 connecting the lower ends of the legs in position to engage the wall W beneath the rack. More particularly, the legs are bent intermediate their upper and lower ends, as best shown in FIGS. 3, 4 and 5, so as to initially maintain the base at a small angle with respect to the vertical, but are flexible intermediate their ends to permit them to be spring to a wider angle and thus to cushion movement of the base to a more vertical position when loaded by the bicycle.

The legs are connected to the bar 29 by means of nuts 36 threadedly connected to the upper ends of the legs 34 above and below the bar. Thus, one nut may be backed off to permit the other nut to be rotated in order to move the legs either upwardly or downwardly. Lowering of the legs from the positions of FIG. 3 to that of FIG. 5 will lower the point of engagement of the part 35 with the wall, and thus lessen the resistance of the legs to flexing inwardly so as to permit the base to assume a more vertical position than it would otherwise, as for example in the case of a light weight bike.

The bicycle frame is adapted to rest upon generally "V" shaped arms 40 each of which has one end 41 pivotally mounted on the rack in horizontally spaced relation with respect to the other, preferably outwardly of the legs 34, and an opposite end 42 extending therefrom. Thus, the arms may be swung about their pivotal connection to the rack between positions in which they are generally beneath the lower end of the base, and thus in an out-of-the-way position for packaging or when not in use, and outwardly extending positions to fit beneath the frame of the bicycle, as shown in FIG. 4 in the case of a boy's bicycle, as well as in FIG. 8 in the case of a girl's bicycle. The arms are somewhat flexible, when so loaded, and in any event, the load of the bicycle is transmitted to the base which in turn transmits it to the legs 34 to cause them to flex inwardly, as shown by a comparison of FIGS. 3 and 4, when loaded by the bicycle.

The pivotal mounting of the ends of the arms 41 about vestical axes enables them to be swung to a desired angular relationship with respect to one another depending on the construction of the bicycle frame. For example, they may be swung to substantially parallel positions when receiving the frame of a boy's bicycle, as shown in FIG. 1, or to positions in which they diverge from one another somewhat, as shown in FIG. 8, so as to support the frame of a girl's bicycle.

The ends of the arms extend vertically through holes in both the upper and lower bars 28 and 29, and are secured to the frame by means of nuts 43 threadedly connected to the ends of the arms above and below the upper and lower bars respectively. Thus, when the nuts are tightened against the upper and lower ends of the bars, they will maintain the arms in a desired outwardly extending position. However, one or both nuts 43 may be loosened to permit the arms to be moved to other outwardly extending positions, or to their inner positions in which they are beneath the lower end of the base, following which they may be retightened. As shown, the arms extend through sleeves 44 which are held at their opposite ends between the bars 28 and 29 and which act as columns in reinforcing the rack so as to assist it in supporting the load of the bicycle.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed and desired to be secured by Letters Patent is:

1. A rack for mounting a bicycle from a subtantially vertical wall by means of a pair of horizontally spaced picture hooks, comprising;
   a relatively wide base having rings pivotally mounted on a back side thereof each to fit within a hook so as to suspend the base therefrom,
   means carried by the base for engaging the wall beneath the hooks in order to hold the base in an outwardly inclined position with respect to the wall, and
   means carried by the base for extending from a front side thereof in order to support the bicycle frame therefrom,
   said wall engaging means being flexible and inwardly yieldable so as to permit the base to assume a more vertical position under the weight of the bicycle.

2. A rack as described in claim 1, wherein
   the wall engaging means comprises legs whose upper ends are connected to the base and whose lower ends are bent inwardly with respect to the upper ends to engage the wall below the base
   said legs being flexible intermediate their upper and lower ends.

3. A rack as described in claim 2, including
   means connecting the upper ends of the legs to the base for vertical adjustment with respect thereto in order to raise or lower their lower ends.

4. A rack as described in claim 2, wherein
   the lower ends of the legs are connected by a horizontally extending member which is slidable vertically along the wall a the legs flex.

5. A rack as described in claim 1, wherein
   the supporting means comprises a pair of generally "V" shaped arms each having one end pivotally connected to the base for swinging thereabout between an inner position in which its other end is beneath the lower end of the base and an outer position in which its other end extends therefrom in horizontally spaced relation with respect to the other arm.

6. A rack as described in claim 5, wherein
   the one end of each arm is pivotally connected to the base for swinging about a generally vertical axis so that the other ends thereof may be disposed in outer positions extending at selected angles with respect to one another.

* * * * *